(12) United States Patent
Bush (10) Patent No.: US 8,167,597 B2
(45) Date of Patent: May 1, 2012

(54) SHAFT BEARINGS, COMPRESSOR WITH SAME, AND METHODS

(75) Inventor: James W. Bush, Skaneateles, NY (US)

(73) Assignee: Bitzer Scroll Inc., Syracuse, NY (US)

( * ) Notice: Subject to any disclaimer, the term of this patent is extended or adjusted under 35 U.S.C. 154(b) by 523 days.

(21) Appl. No.: 12/409,091

(22) Filed: Mar. 23, 2009

(65) Prior Publication Data

US 2010/0239447 A1 Sep. 23, 2010

(51) Int. Cl.
*F01C 17/00* (2006.01)
*F03C 2/00* (2006.01)
*F04C 2/00* (2006.01)

(52) U.S. Cl. ......... 418/182; 418/55.5; 418/57; 418/152; 418/178; 418/179; 29/888.022; 29/898.066; 384/26; 384/276; 384/295; 384/297

(58) Field of Classification Search .................. 418/152, 418/178, 179, 182, 55.1–55.6, 57, 270, 1; 29/888.022, 898.066; 384/295–297, 276, 384/192, 26

See application file for complete search history.

(56) References Cited

U.S. PATENT DOCUMENTS

| | | | | | |
|---|---|---|---|---|---|
| 3,004,323 | A | * | 10/1961 | Pitner | ....................... 29/898.066 |
| 3,623,205 | A | * | 11/1971 | Scott | .............................. 384/276 |
| 4,561,787 | A | * | 12/1985 | Ehrentraut et al. | ........... 384/295 |
| 4,836,758 | A | * | 6/1989 | Elson et al. | .................... 418/182 |
| 5,174,738 | A | | 12/1992 | Baumann et al. | |
| 5,403,171 | A | * | 4/1995 | Sugita et al. | ................. 418/55.1 |
| 6,109,899 | A | | 8/2000 | Barito et al. | |
| 6,168,403 | B1 | * | 1/2001 | Bush | ............................. 418/55.1 |
| 6,398,530 | B1 | | 6/2002 | Hasemann | |
| 6,814,551 | B2 | | 11/2004 | Kammhoff et al. | |
| 6,960,070 | B2 | | 11/2005 | Kammhoff et al. | |
| 7,112,046 | B2 | | 9/2006 | Kammhoff et al. | |
| 7,661,939 | B2 | * | 2/2010 | Su et al. | ........................ 418/182 |

FOREIGN PATENT DOCUMENTS

| | | | |
|---|---|---|---|
| JP | 03003988 A | * | 1/1991 |
| JP | 04058089 A | * | 2/1992 |
| JP | 05-044401 A | | 2/1993 |

(Continued)

OTHER PUBLICATIONS

Taiho Products; Bushings and Thrust Washers; Realizing Maintenance-free Performance—TAIHO Dry Bearing Line-up FF/RA series (coating); printed from website, date last visited Oct. 28, 2008; 2 pages; http://www.taihonet.co.jp/e/ssc.html.

(Continued)

*Primary Examiner* — Theresa Trieu (74) *Attorney, Agent, or Firm* — Reinhart Boerner Van Deuren P.C.

(57) ABSTRACT

A bearing material composition that lines a support includes a combination of a thermoplastic conforming material and abrasive particles which provide a combined effect for remedying the effects due to edge loading that may be caused by misalignment between the bearing and a shaft to which a portion is rotatably mounted. The conforming material may be PTFE such that it does not have a memory and is subject to cold flow and creep. As a result, misalignment problems and edge loading are remedied by the combination of abrasive removal of metal material from the drive shaft at the location of edge loading and creep of the conforming material at the location of edge loading which may provide an overall greater bearing interface surface.

25 Claims, 4 Drawing Sheets

FOREIGN PATENT DOCUMENTS

| | | | |
|---|---|---|---|
| JP | 03-572345 | B2 | 7/2007 |
| KR | 10-0719385 | B1 | 5/2007 |

OTHER PUBLICATIONS

Taiho Products; Bushings and Thrust Washers; TAIHO Dry Coating RA Series; printed from website, date last visited Oct. 28, 2008; 2 pages; http://www.taihonet.co.jp/e/ra.html.

Taiho Products; Bushings and Thrust Washers; Realizing Maintenance-free Performance—TAIHO Dry Bearing Line-up FB/CB series (bi-metal); printed from website, date last visited Nov. 4, 2008; 2 pages; http://www.taihonet.co.jp/e/ssb.html.

GGB Bearing Technology; Metal-Polymer Materials; printed from website; date last visited Oct. 28, 2008; 2 pages; http://www.ggbearings.com/.asp?MaterialID=62&Group=1.

* cited by examiner

SHAFT BEARINGS, COMPRESSOR WITH SAME, AND METHODS

FIELD OF THE INVENTION

The present invention generally relates to bearing support structures and may relate more specifically to bearing support structures used in specific applications such as compressors and according to one embodiment, scroll compressors.

BACKGROUND OF THE INVENTION

A scroll compressor is a certain type of compressor that is used to compress refrigerant for such applications as refrigeration, air conditioning, industrial cooling and freezer applications, and/or other applications where compressed fluid may be used. Such prior scroll compressors are known, for example, as exemplified in U.S. Pat. No. 6,398,530 to Hasemann; U.S. Pat. No. 6,814,551, to Kammhoff et al.; U.S. Pat. No. 6,960,070 to Kammhoff et al.; and U.S. Pat. No. 7,112,046 to Kammhoff et al., all of which are assigned to a Bitzer entity closely related to the present assignee. As the present disclosure pertains to improvements that can be implemented in these or other scroll compressor designs, the entire disclosures of U.S. Pat. Nos. 6,398,530; 6,814,551; 6,960,070; and 7,112,046 are hereby incorporated by reference in their entireties.

As is exemplified by these patents, scroll compressors conventionally include an outer housing having a scroll compressor contained therein. A scroll compressor includes first and second scroll compressor members. A first compressor member is typically arranged stationary and fixed in the outer housing. A second scroll compressor member is moveable relative to the first scroll compressor member in order to compress refrigerant between respective scroll ribs which rise above the respective bases and engage one another. Conventionally, the moveable scroll compressor member is driven about an orbital path about a central axis for the purposes of compressing refrigerant. An appropriate drive unit, typically an electric motor, is provided usually within the same housing to drive the movable scroll member.

To support the high speed rotation of a drive shaft within a scroll compressor, shaft bearings are conventionally employed as shown in the above-mentioned patents and as discussed in some detail in U.S. Pat. No. 6,109,899. As discussed therein, a bearing incorporates a composite resin material that includes a graphite and a heat resistance resin complex layer that includes hard carbon particles deposited into a resin base. The bearing indicated is said to be made by Taiho Kogyo, Ltd. under the trade name, "Carbon Composite Bimetal Bearings CB 100G", which is formed of a material that is a hard thermoset resin that is irreversibly cured. Such a thermoset material cannot be melted or re-shaped after it is cured. As a result, and in such applications as a scroll compressor, this material requires further machining processes to provide for a precision fit and alignment between the shaft and bearing surfaces of the upper and lower bearing members and the drive hub of the movable scroll member. Thus, while there are some advantages to this approach, one of the draw backs of this approach is the additional cost and complexity associated with the need to machine the bearing surface to provide for a highly precise fit between the shaft and the bearing surfaces.

More conventionally in scroll compressors, cylindrical bearings will be lined with some of the following materials: bronze, leaded bronze, babbitt alloy, PTFE, PTFE composite (with lead and/or trace amounts of silicon oxide—believed to be less than 1% by volume). Despite many years and many different materials tried for bearing materials in such scroll compressors, it is still believed that there is a substantial deficiency in the present state of the art, and the present invention is directed towards improvements over the state of the art.

BRIEF SUMMARY OF THE INVENTION

The present invention is directed toward improvements in the bearing materials such as may be used in a compressor apparatus for refrigerants including at least one bearing and a shaft of metal material, which has a shaft portion rotatably mounted relative to the at least one bearing. The bearing comprises a support and a material composition lining the support. The material composition of the bearing liner includes a conforming material with abrasive particles contained therein. In such structures, any misalignment, no matter how slight, between the at least one bearing in the shaft is adapted to create edge loading therebetween. With the unique material composition of this inventive aspect, a combination of remedial measures is accomplished including the combination of abrasive removal of metal material of the shaft at a location of edge loading; and also creep of the conforming material at the edge loading so that the bearing also conforms to misalignment.

Preferably, it is envisioned that at least 20% of the edge loading according to maximum misalignment design tolerance is accommodated by creep of the conforming material, and at least 20% of the edge loading according to maximum misalignment design tolerances is accommodated by abrasive removal of metal material of the shaft. For example, as envisioned in FIG. 6, roughly 50% of edge loading might be accommodated by each member (shaft and bearing), measured by maximum radius change differentials to the shaft and bearing liner from original. The abrasive particles may act as a filler and/or additional filler materials may be used in the conforming material to thereby act as a creep control agent to determine how readily the conforming material of the material composition can move or creep along the surface of the support. Preferably, the support is in the form of a metal sleeve having a sintered metal surface, in which thermoplastic conforming material and abrasive particles may be embedded and mechanically locked and molded thereto.

It is a further aspect of the present invention that such an apparatus according to the above aspect may be integrated and part of a scroll compressor. Such an apparatus further includes a housing and scroll compressor bodies in the housing including a fixed scroll body and a movable scroll body. The scroll bodies have respective bases and respective scroll ribs that project from the respective bases and which mutually engage. The movable body is movable relative to the fixed scroll body for compressing fluid through a discharge port. An electrical motor in the housing has a rotational output on the shaft to drive the shaft about a rotational axis. The shaft includes a drive member (which may be said portion rotatably mounted to the bearing) that acts upon the movable scroll body at an offset drive axis that is offset and generally parallel to the rotational axis. With this offset arrangement, rotation of the shaft causes the drive member to move the movable scroll body in an orbital path relative to the fixed scroll body to thereby facilitate the compression of refrigerant or other fluid.

The conforming material is preferably a film of thermoplastic material that is free of memory and creeps to conform to a mating surface of the shaft. The conforming material specifically excludes thermosets to avoid the problems associated therewith in that the material cannot flow or creep once it is cured. Preferably the conforming material includes a fluoropolymer such as that sold under the brand name Teflon (polytetrafluoroethylene or PTFE). The abrasive particles may be selected from the group consisting of graphite, glass, silica, aluminum oxide, diamond, cubic boron nitride, silicone carbide, boroncarbide, alumina or other appropriate abrasive material.

Another aspect of the present invention is directed toward a method of assembling such a shaft and bearing apparatus. The method includes molding the conforming material onto the support to provide a bore with a raw molded un-machined surface; assembling the shaft with the at least one bearing without machining of the raw molded un-machined surface; and accommodating misalignment between the shaft and the at least one bearing by a combination of processes including creeping of the conforming material at a mating interface between the shaft and the at least one bearing, and abrasive grinding of the shaft at the mating interface with the abrasive particles contained within the conforming material. The material composition may be configured by selecting an appropriate thermoplastic conforming material and a selected quantity of abrasive particles to accommodate a maximum misalignment tolerance that is designed to be accommodated between the at least one bearing and the shaft.

Another aspect of the present invention is directed toward an apparatus comprising a support and a material composition lining the support in which the material composition includes a matrix material and abrasive particles embedded in the matrix material. The abrasive particles include other than carbon particles and other than a combination of carbon particles and silica together. A shaft comprising of metal material has a portion rotatably mounted relative to the at least one bearing. Misalignment between the at least one bearing and the shaft is adapted to create edge loading therebetween. The edge loading causes abrasive removal of metal material of the shaft at the location of the edge loading.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 5 is a close-up view of an edge loading interface taken at a portion of FIG. 4 with the greatly exaggerated misalignment demonstratively illustrated, but shown prior to run in.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
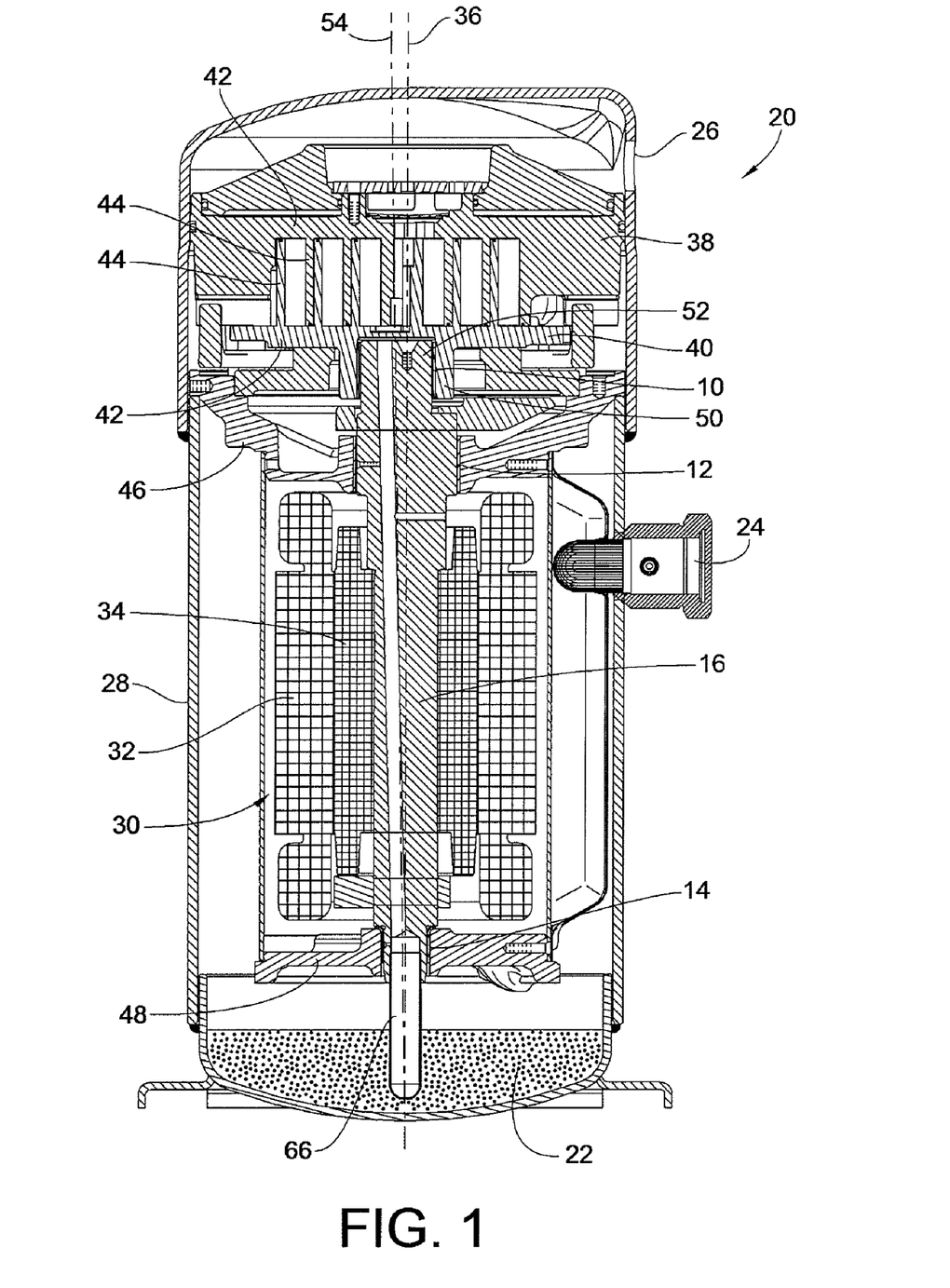
FIG. 1 is a cross sectional illustration of a scroll compressor according to an embodiment of the present invention.

An embodiment of the present invention has been illustrated as one or more bearing sleeves 10, 12 and 14 that are rotatably mounted relative to a drive shaft 16 in the environment and application of a scroll compressor assembly 20. The scroll compressor assembly 20 operates in an environment of lubricating oil 22 and is suitable for compressing refrigerant which enters through inlet 24. Within the scroll compressor assembly 20, the refrigerant is compressed and exits an outlet 26 in a compressed state.

Before turning to the details of one or more of the bearing sleeves 10, 12, 14, some background about the illustrated scroll compressor assembly 20 will be provided for orientation purposes, although it is understood that this invention may also be applicable to other compressor configurations for refrigerant and the like. Scroll compressor assembly 20 generally includes an outer housing 28 that includes the inlet 24 and outlet 26. The housing 28 may typically comprise one or more stamped formed sheet steel shell sections that are welded together to provide an enclosed space. The housing 28 contains a drive unit 30 that may take the form of an electrical motor including a stator 32 and a rotor 34. With this configuration, energization of the stator 32 is operative to rotate the rotor 34 about a central axis 36 and thereby rotate the drive shaft 16 which is affixed to the rotor 34.

The scroll compressor assembly also includes scroll compressor bodies. which include a fixed scroll compressor body 38 and a movable scroll compressor body 40. The scroll compressor bodies 38, 40 have respective bases 42 and scroll ribs 44 that project from the respective bases 42 and which mutually engage to create compression chambers for the compression of refrigerant or other such fluid. The drive unit 30 has a rotational output on the drive shaft 16 that is operable to drive the movable scroll compressor body 40 about an orbital path relative to the fixed scroll compressor body 38 and thereby facilitate the compression of fluid. Further details of such a scroll compressor arrangement is further described in the aforementioned patents, which have hereby been incorporated by reference in their entireties.

As it pertains to the bearing interfaces provided by bearing sleeves 10, 12 and 14, it is seen that each of these bearing sleeves are rotatably mounted relative to the drive shaft 16. Specifically, to journal the drive shaft for rotation about the central axis 36, an upper bearing member 46 and lower bearing member 48 are provided with respective bearing sleeves 12, 14 to support the drive shaft for rotation about the central axis 36. In contrast, the other bearing sleeve 10 lines the inside of a drive hub 50 extending from the base 42 of the movable scroll compressor body and receives an offset drive pin 52 (of the drive shaft) that is offset relative to the central axis 36 but aligned on a drive axis 54. The drive pin 52 and the drive hub 50 are rotatable relative to each other about the drive axis 54 and during rotation of the drive shaft, the rotation of the drive pin 52 around the central axis 36 facilitates the relative orbital movement between the movable and fixed scroll compressor bodies. As such, with this configuration, there is a bottom bearing supporting the shaft about the rotational central axis 36 and upper bearing supporting the shaft about the rotational central axis 36 and a drive bearing journaling the offset drive pin about the offset drive axis 54.

While there is a substantial attempt, when assembling the scroll compressor assembly 20, to have the drive shaft perfectly aligned relative to the upper and lower bearing members 46, 48 for rotation about the central axis 36, unfortunately no alignment is ever perfect and some misalignment due to design or assembly tolerances is inevitable. Further, in the case of the offset drive pin 52 with an additional drive axis 54 and interface with the drive hub 50, further alignment issues can result. This can result in edge loading at locations 56 generally indicated in the greatly exaggerated misalignment view of FIG. 4, in which exaggeration is shown for demonstrative understanding reasons.

Figure 4:
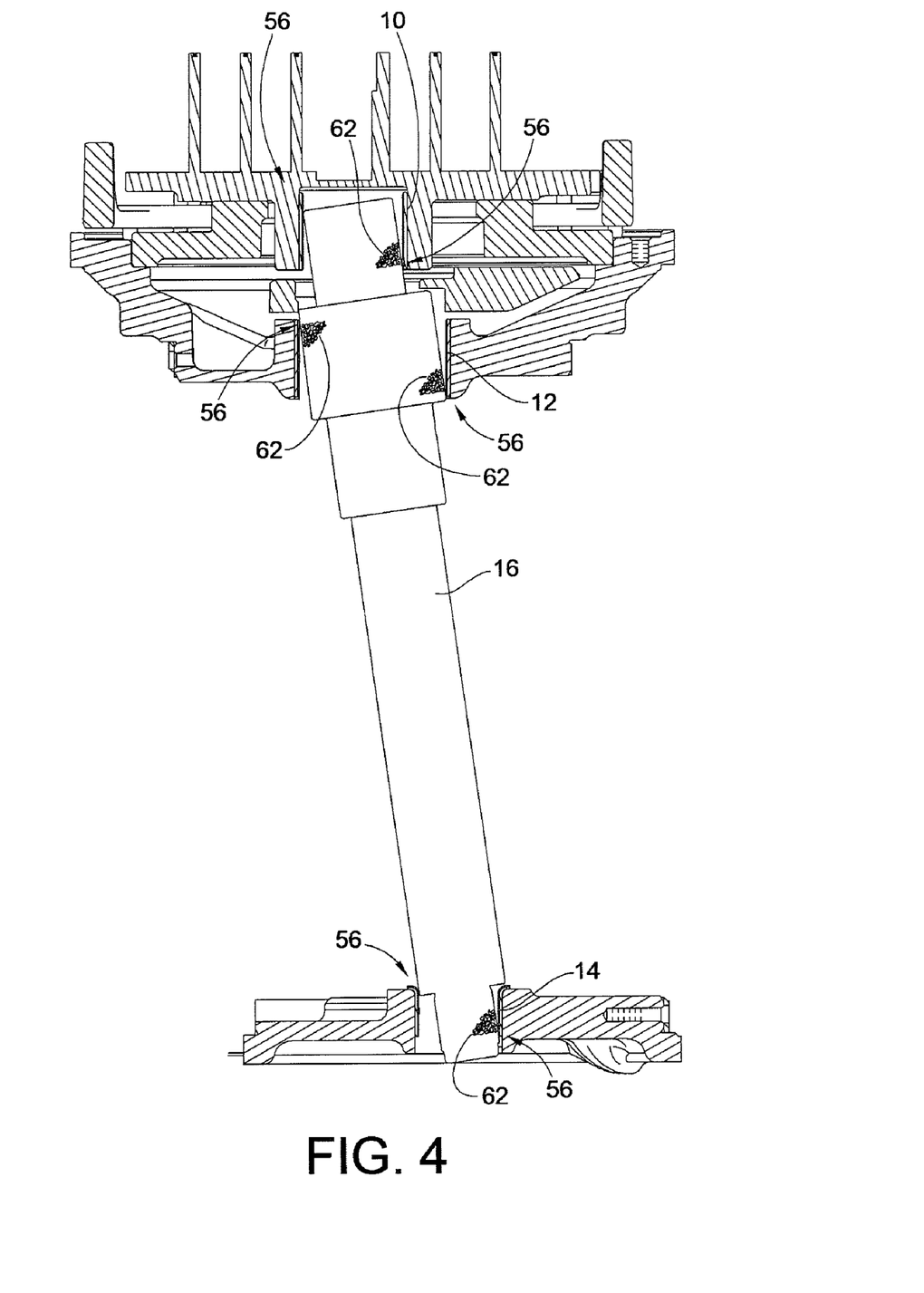
FIG. 4 is a greatly exaggerated demonstrative view of misalignment between the drive shaft and corresponding bearings to illustrate edge loading in accordance with an embodiment of the present invention.

It will be understood in viewing the greatly exaggerated view of FIG. 4, that in reality most of the edge loading comes from movement of the shaft in the clearance between the shaft and the bores and only some from misalignment of the bearing bores (this reality would be difficult to illustrate in an exaggerated view). In other words and in exaggerated language, the shaft is "rattling loose" in the bearing bores, even if the bores are perfectly aligned. The external loading on the shaft occurs at bearing 10—this is a cantilevered type load since it occurs outboard of the two shaft supports at bearings 12 and 14. This causes the shaft to tilt in the manner shown in FIG. 4 (moving through the bearing clearances) and to edge load. Any misalignment of upper and lower members 46 and 48 simply modify the degree of edge loading as the shaft rotates through a cycle.

The loading is stationary with respect to the shaft. That is the load rotates around the bores of bearings 10, 12, and 14 with the shaft. This means the same portion of the shaft is edge loaded all the time while the edge load is distributed around the bore of the bearings. Thus the shaft will have zones which are always loaded and zones which are always unloaded. FIG. 4 shows the loaded zones of the shaft shaded in. These loaded zones look more like a "fingerprint" and not necessarily form a groove in the shaft. The shaded portions of FIG. 4 are the only areas on the shaft which would wear (it is also unlikely that the lower zone of the middle bearing would wear unless the upper and lower members 46 and 48 were severely misaligned).

However, the deformable material in the bearing liner would deform all the way around, forming a slight conical shape where it contacts the shaft.

If the situation were otherwise, if the load was stationary with the housing, then the same effect could be achieved without the abrasive material. The shaft could be pre-machined to a slight taper and the conformable bearing material would be shaped locally in the area where the stationary load acts. The abrasive liner is of most benefit when the load rotates.

The present embodiment combats the edge loading with a combination of remedial measures through use of a unique material composition that includes a thermoplastic conforming material with abrasive particles embedded therein. As a result, edge loading causes a combination of abrasive removal of metal material of the drive shaft 16 and creates abraded removal regions 62 therein and also creates creep 64 of the conforming material at the locations of edge loading (e.g. creating grooves in the bearing liner). Due to the thermoplastic nature of the conforming material 60 and that it is not cross linked or cured (e.g. it is preferably not thermoset), it has no "memory" and is subject to creep that may also be known as compression flow and compression set. Suitable thermoplastic conforming materials may include non-cross linked elastomers (e.g. thermo plastic materials), and more preferably a fluoropolymer such as polytetrafluoroethylene (PTFE) sold by DuPont under the tradename Teflon.

Considering its thermoplastic nature, the thermoplastic conforming material 60 will technically melt to a liquid when it is heated sufficiently. Such thermoplastic materials include addition polymers such as vinyl, chain-growth polymers including polyethylene and polypropylene. Other thermoplastics include such materials as polystyrene, and nylon. The difference between thermoplastics and thermosetting resins is that thermoplastics become soft, remeltable and remoldable when heat is added. In contrast, thermosetting resins, when heated, will chemically decompose so that they cannot be melted or remolded, and once cured thermosets take on a fixed irreversible shape.

PTFE is a preferred choice as it can withstand high temperatures without property degradation until about 260° C. and has a melting point that is reported to be about 327° C. As such, this material is particularly suitable for scroll compressor applications which do not typically operate above those temperatures, even with the anticipated addition of fillers such as abrasives within the material according to embodiments of the present invention. Further, below these temperatures, the PTFE thermoplastic conforming material 60 is subject to creep via cold flow and compression set. It should be noted that this creep, to some extent, can be controlled by use of compounding fillers to control unwanted creep and improved wear, friction or other properties such as abrasiveness in this case. Due to its low friction, PTFE is particularly advantageous in the present use of bearing linings. It is also suitable for use with lubrication of the lubricating oil 22 that is impelled through central channels within the drive shaft 16 by an impeller 66 that operates during rotation of the drive shaft, and thereby impels and feeds lubricating oil 22 from the sump, where it is contained to the bearing interface surfaces.

Suitable filler materials are incorporated into the thermoplastic conforming material 60 to include abrasives as mentioned and/or other such fillers that may have other properties such as creep control or lubricity. For example, filler materials are contemplated to include between 2% and 25% by volume of the overall material composition (some or all of which may be abrasive particle type); the remainder being the thermoplastic conforming material 60. And preferably between at least 5% and 15% by volume of the overall material composition that lines the bearing support is abrasive particle type filler material. Suitable abrasive particles that are contemplated include a least one selected from the group consisting of graphite, glass, silica, aluminum oxide, diamond, cubic boron nitride, silicone carbide, boron carbide and alumina, although other abrasive particles may perform well. An abrasive is the type of material that will etch, and thereby abrasively grind off material from the drive shaft 16 to create the abraded regions 62 as indicated in the drawings. Typically and preferably, the abrasive material has a greater hardness than that of the steel material or other metal material that makes up the drive shaft 16. The abrasive particles are in sufficiently low volume and percentage numbers as to controllably limit the amount of abrasive grinding that occurs during operation.

Figure 2:
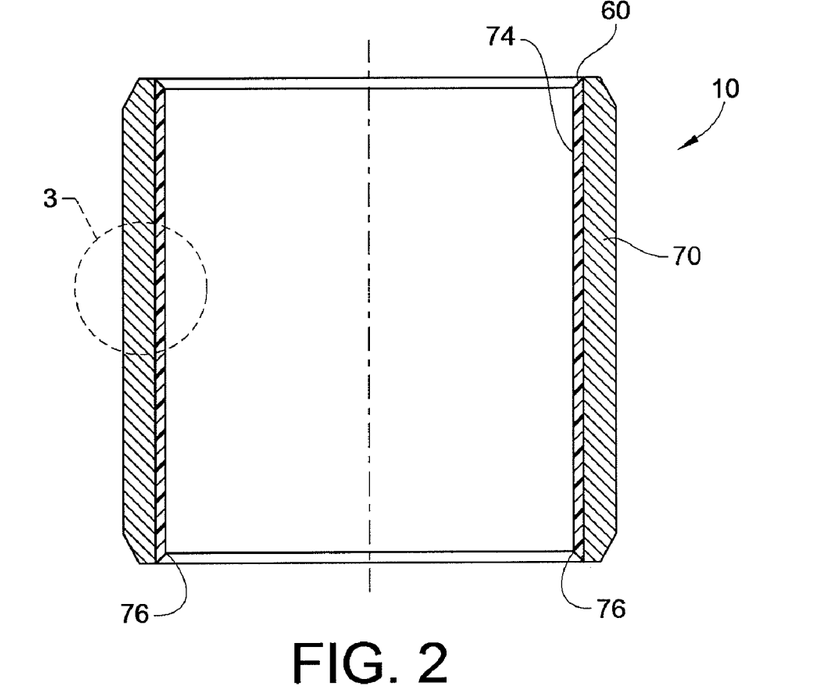
FIG. 2 is a cross sectional illustration of a bearing sleeve for supporting a drive shaft in accordance with an embodiment of the present invention.
Figure 3:
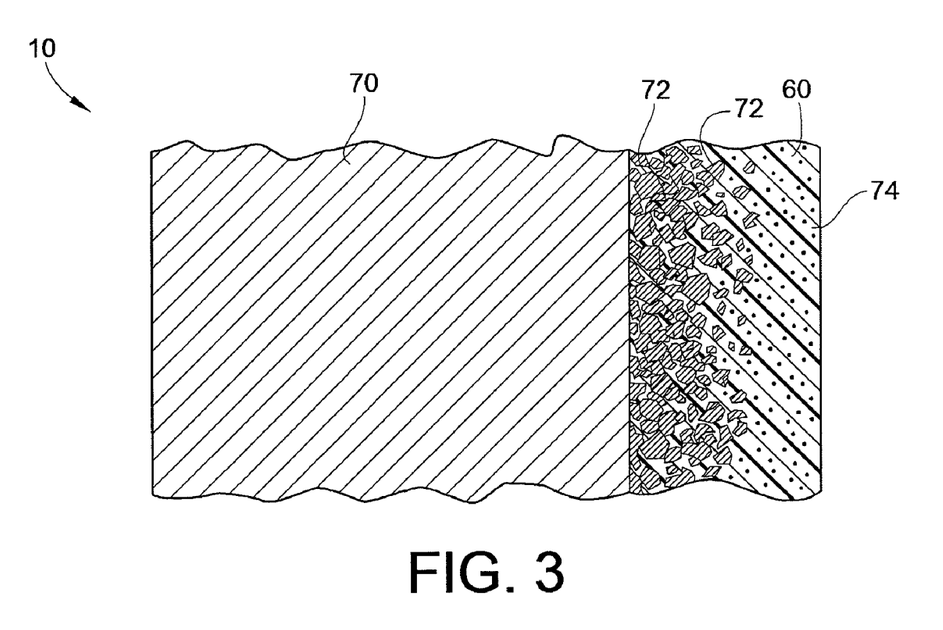
FIG. 3 is a close-up cross sectional illustration of a portion of the bearing member shown in FIG. 2.
Figure 5:
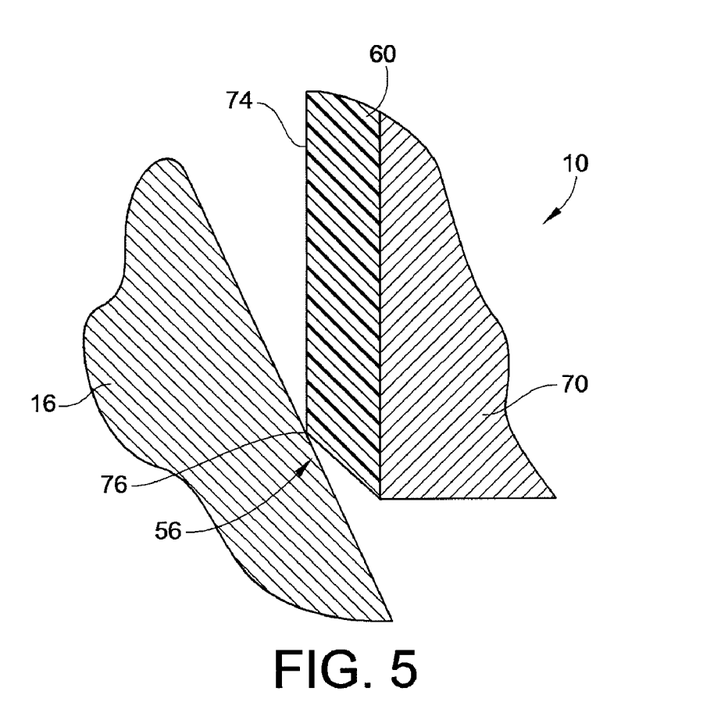
Figure 6:
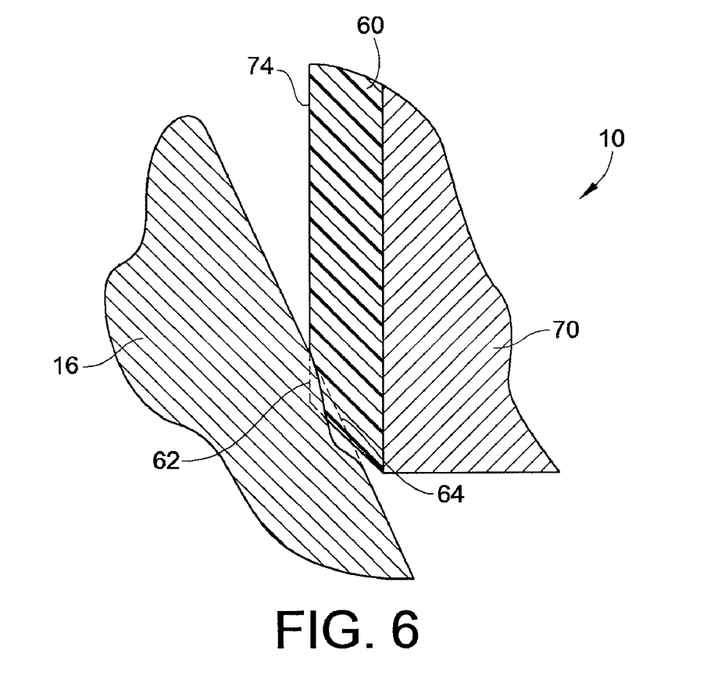
FIG. 6 is the same view as FIG. 5 except that initial run-in of the scroll compressor has occurred to demonstratively illustrate the combination of abrasive removal of material from the drive shaft and creep of the thermal plastic bearing composition material (the displaced bearing material not being shown).

The bearing material composition may directly line the inside peripheries of the upper bearing member 46, the lower bearing member 48, and the drive hub 50 or may as illustrated in the figures and shown, for example, in FIG. 2, take the form of a bearing sleeve 10, 12, 14 that can be mounted and fixed in place in these respective locations. In the bearing sleeve 10 (comments and details below to bearing sleeve 10 are also applicable and will be understood to apply to bearing sleeves 12,14), there is a support section that includes a cylindrical steel shell 70 that is lined with sintered bronze or other metal material particles 72 to provide a porous surface into which the bearing material composition including the thermoplastic conforming material 60 (with abrasive particles embedded therein) can be molded onto and mechanically secured in place. The molding can be done by a number of methods, but typically the thermoplastic conforming material 60 will provide an inner bore 74 that has a raw molded un-machined surface that need not be machined prior to assembly into the scroll compressor assembly 20. This is due to the fact that the thermoplastic conforming material 60 can creep, and therefore accommodate imprecision or inaccuracies in the bore surface. Thus, subsequent honing and machining operations are not necessary to precisely provide a concentric diameter for the inner bore 74 relative to the relevant portion of the drive shaft 16. Instead, misalignment between the shaft and the one or more bearings can be accommodated by a combination of processes including creeping of thermoplastic conforming material at the mating interface between the shaft and the respective bearings and abrasive grinding of the shaft at the mating interface. Any misalignment can be corrected during initial run in of the scroll compressor, in which the scroll compressor is initially run for the first time to break in the respective bearing interface surfaces. This can be seen by comparing FIG. 5 (prior to run in and after manufacture) and FIG. 6 (after initial run in and break in of the surfaces). As shown in FIG. 6, the hard corner 76 of the bearing material has been rounded off due to the creep 64 of material caused by flow due to impact; with the material of the creep being shown as displaced in FIG. 6 as compared with FIG. 5. Additionally, the abrasive particles contained within the thermoplastic material tend to form abraded regions 62 into the drive shaft 16. By virtue of the combination of these features, overall longer bearing interface is provided as compared with prior art, and the problems associated with edge loading may be remedied at least in part due to the combination of creep and abrasive removal of material.

The thermoplastic material composition can be configured by selecting a thermoplastic conforming material and a selected quantity of abrasive particles to accommodate the maximum misalignment tolerance between the shaft and bearing by a combination of abrasive removal of metal material from the shaft and creeping displacement of thermoplastic conforming material. For example, it is contemplated that at least 20% of the edge loading according to a maximum misalignment design tolerance is accommodated by creep of conforming material; and at least 20% of the edge loading according to a maximum misalignment design tolerances is accommodated by abrasive removal of metal material of the shaft. Therefore, each acts in a significant way to overall increase the bearing interface surface area and remedy the effects of edge loading and misalignment issues.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus, comprising:
   at least one bearing comprising a support and a material composition lining the support, the material composition including a conforming material and abrasive particles, the abrasive particles comprising at least about 2% by volume of the material composition; and
   a shaft comprising metal material having a portion rotatably mounted relative to the at least one bearing, wherein misalignment between the at least one bearing and the shaft is adapted to create edge loading therebetween, wherein the edge loading causes a combination abrasive removal of metal material of the shaft at a location of the edge loading and creep of the conforming material at the edge loading.

2. The apparatus of claim 1, wherein at least 20% of the edge loading according to maximum misalignment design tolerance is accommodated by creep of the conforming material; and at least 20% of the edge loading according to maximum misalignment design tolerance is accommodated by abrasive removal of metal material of the shaft.

3. The apparatus of claim 1, further comprising a filler in the conforming material acting as a creep control agent.

4. The apparatus of claim 1, further comprising:
   a compressor mechanism having an inlet and an outlet, the compressor mechanism being acted upon by the shaft and compressing fluid from the inlet to the outlet in response to operative rotation of the shaft.

5. The apparatus of claim 4, further comprising:
   a housing;
   wherein the compressor mechanism is a scroll compressor mechanism including scroll compressor bodies in the housing including a fixed scroll body and a movable scroll body, the scroll bodies having respective bases and respective scroll ribs that project from the respective bases and which mutually engage, the moveable body being moveable relative to the fixed scroll body for compressing fluid through a discharge port; and a motor in the housing having a rotational output on the shaft to drive the shaft about a rotational axis, the shaft including a drive member acting upon the moveable scroll body at an offset drive axis that is offset and generally parallel to the rotational axis.

6. The apparatus of claim 5, wherein the at least one bearing comprises at least three bearings including:
   a bottom bearing supporting the shaft about the rotational axis;
   an upper bearing supporting the shaft about rotational axis; and
   a drive bearing journaling the drive member about the offset drive axis.

7. The apparatus of claim 1, wherein the conforming material is a thermoplastic, wherein the conforming material is free of memory and creeps to conform to a mating surface of a shaft, and wherein the abrasive particles are present in an amount of between 5 and 15% of volume of the material composition.

8. The apparatus of claim 1, wherein the conforming material includes a fluoropolymer.

9. The apparatus of claim 8, wherein the conforming material includes polytetrafluoroethylene.

10. The apparatus of claim 1, wherein the abrasive particles include at least one selected from the group consisting of graphite, glass, silica, aluminum oxide, diamond, cubic boron nitride, silicon carbide, boron carbide, and alumina.

11. The apparatus of claim 1, wherein said support includes a cylindrical shell having a cylindrical inner surface and sintered particle material lining the cylindrical inner surface, and said material composition is embedded and mechanically interlocked with the sintered particle material, has an initial shape defining a bore.

12. The apparatus of claim 11, wherein the material composition is molded onto the sintered particle material and wherein the bore is defined by a raw molded un-machined surface.

13. An apparatus, comprising:
   at least one bearing comprising a support and a material composition lining the support, the material composition including a thermoplastic conforming material and abrasive particles, the abrasive particles comprising at least about 2% by volume of the material composition;
   a shaft comprising metal material having a portion rotatably mounted within the at least one bearing, wherein misalignment between the at least one bearing and the shaft is adapted to create edge loading therebetween, wherein edge loading causes a combination abrasive removal of metal material of the shaft at a location of edge loading and creep of the conforming material at the edge loading;
   a compressor mechanism having an inlet and an outlet, the compressor mechanism being acted upon by the shaft and compressing fluid from the inlet to the outlet in response to operative rotation of the shaft;
   a housing;
   wherein the compressor mechanism is a scroll compressor mechanism including scroll compressor bodies in the housing including a fixed scroll body and a movable scroll body, the scroll bodies having respective bases and respective scroll ribs that project from the respective bases and which mutually engage, the moveable body being moveable relative to the first scroll for compressing fluid through a discharge port;
   an electrical motor in the housing including a rotor and a stator having a rotational output on the shaft to drive the shaft about a rotational axis, the shaft including a drive member acting upon the moveable scroll body at an offset drive axis that is offset and generally parallel to the rotational axis;
   wherein the thermoplastic conforming material is free of memory and creeps to conform to a mating surface of a shaft; and
   wherein said support includes a cylindrical shell having a cylindrical inner surface and sintered particle material lining the cylindrical inner surface, and said material composition is embedded and mechanically interlocked with the sintered particle material, has an initial shape defining a bore.

14. The apparatus of claim 13, wherein the at least one bearing comprises at least three bearings including:
   a bottom bearing supporting the shaft about the rotational axis;
   an upper bearing supporting the shaft about rotational axis; and
   a drive bearing journaling the drive member about the offset drive axis.

15. The apparatus of claim 13, wherein the material composition is molded onto the sintered particle material and wherein the bore is defined by a raw molded un-machined surface.

16. The apparatus of claim 13, wherein the thermoplastic conforming material includes a fluoropolymer.

17. The apparatus of claim 16, wherein the thermoplastic conforming material includes polytetrafluoroethylene.

18. The apparatus of claim 17, wherein the abrasive particles include at least one selected from the group consisting of graphite, glass, silica, aluminum oxide, diamond, cubic boron nitride, silicon carbide, boron carbide, and alumina.

19. A method of assembling the apparatus of claim 1, comprising:
   molding the conforming material onto the support to provide a bore with a raw molded un-machined surface;
   assembling the shaft with the at least one bearing without machining of the raw molded un-machined surface; and
   accommodating misalignment between the shaft and the at least one bearing by a combination of processes including creeping of the thermoplastic conforming material at a mating interface between the shaft and the at least one bearing and abrasive grinding of the shaft at the mating interface with the abrasive particles, the abrasive particles comprising at least about 2% by volume of the material composition.

20. The method of claim 19, further comprising:
   designing a maximum misalignment tolerance between the at least one bearing and the shaft; and
   configuring the material composition by selecting a thermoplastic conforming material and a selected quantity of abrasive particles to accommodate the maximum misalignment tolerance by a combination of abrasive removal of metal material from the shaft and creeping displacement of the thermoplastic conforming material such that at least 20% of the edge loading according to maximum misalignment design tolerance is accommodated by creep of the conforming material; and at least 20% of the edge loading according to maximum misalignment design tolerance is accommodated by abrasive removal of metal material of the shaft.

21. An apparatus, comprising:
   at least one bearing comprising a support and a material composition lining the support, the material composition including a matrix material and abrasive particles embedded in the matrix material, the abrasive particles comprising at least about 2% by volume of the material composition, wherein the abrasive particles include other than carbon particles and other than a combination of carbon particles and silica together; and a shaft comprising metal material having a portion rotatably mounted relative to the at least one bearing, wherein misalignment between the at least one bearing and the shaft is adapted to create edge loading therebetween, wherein edge loading causes abrasive removal of metal material of the shaft at a location of edge loading.

22. The apparatus of claim 21, wherein the abrasive particles include at least one selected from the group consisting of glass, aluminum oxide, diamond, cubic boron nitride, silicon carbide, boron carbide, and alumina.

23. The apparatus of claim 21, wherein said support includes an cylindrical shell having a cylindrical inner surface and sintered particle material lining the cylindrical inner surface, and said material composition is embedded and mechanically interlocked with the sintered particle material, has an initial shape defining a bore.

24. The apparatus of claim 21, further comprising:
a compressor mechanism having an inlet and an outlet, the compressor mechanism being acted upon by the shaft and compressing fluid from the inlet to the outlet in response to operative rotation of the shaft;

a housing;

wherein the compressor mechanism is a scroll compressor mechanism including scroll compressor bodies in the housing including a fixed scroll body and a movable scroll body, the scroll bodies having respective bases and respective scroll ribs that project from the respective bases and which mutually engage, the moveable body being moveable relative to the first scroll for compressing fluid through a discharge port; and a motor in the housing having a rotational output on the shaft to drive the shaft about a rotational axis, the shaft including a drive member acting upon the moveable scroll body at an offset drive axis that is offset and generally parallel to the rotational axis.

25. The apparatus of claim 24, wherein the at least one bearing comprises at least three bearings including:
a bottom bearing supporting the shaft about the rotational axis;
an upper bearing supporting the shaft about rotational axis; and
a drive bearing journaling the drive member about the offset drive axis.

* * * * *